(12) United States Patent
Jaradi et al.

(10) Patent No.: US 11,577,686 B2
(45) Date of Patent: Feb. 14, 2023

(54) LOAD-LIMITING SEATBELT RETRACTOR

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 489 days.

(21) Appl. No.: 16/749,424

(22) Filed: Jan. 22, 2020

(65) Prior Publication Data
US 2021/0221326 A1    Jul. 22, 2021

(51) Int. Cl.
*B60R 22/36* (2006.01)
(52) U.S. Cl.
CPC ................... *B60R 22/36* (2013.01)
(58) Field of Classification Search
CPC ......... B60R 22/26; B60R 22/34; B60R 22/36; B60R 22/3413
See application file for complete search history.

(56) References Cited

U.S. PATENT DOCUMENTS

| | | | |
|---|---|---|---|
| 3,790,099 A * | 2/1974 | Beller | B60R 22/3413 297/470 |
| 3,958,774 A | 5/1976 | Penzkofer et al. | |
| 5,836,534 A * | 11/1998 | Bohmler | B60R 22/3413 242/379.1 |
| 6,196,589 B1 | 3/2001 | Smithson et al. | |
| 6,209,916 B1 | 4/2001 | Smithson et al. | |
| 6,669,133 B2 | 12/2003 | Palliser et al. | |
| 9,789,848 B2 | 10/2017 | Jaradi et al. | |
| 10,046,062 B2 | 8/2018 | Stroik, Jr. | |
| 2003/0192976 A1 | 10/2003 | Palliser et al. | |
| 2004/0206844 A1 * | 10/2004 | Shiotani | B60R 22/3413 242/379.1 |
| 2010/0301151 A1 * | 12/2010 | Heitkamp | B60R 22/341 242/379.1 |
| 2013/0126657 A1 | 5/2013 | Stroik, Jr. | |
| 2018/0319364 A1 | 11/2018 | Faruque et al. | |
| 2019/0054893 A1 | 2/2019 | Vo et al. | |

* cited by examiner

*Primary Examiner* — Sang K Kim
(74) *Attorney, Agent, or Firm* — Frank A. MacKenzie; Bejin Bieneman PLC

(57) ABSTRACT

A restraint system includes a retractor housing, a spool rotatably coupled to the retractor housing and defining an axis of rotation, a threaded rod lockable relative to the retractor housing and elongated along the axis, a nut threaded on the threaded rod, and a spring elongated from a first end to a second end. The first end is fixed relative to the spool, and the second end is fixed relative to the nut.

17 Claims, 8 Drawing Sheets

LOAD-LIMITING SEATBELT RETRACTOR

BACKGROUND

Vehicles include restraint systems. The restraint system for a seat of a vehicle is typically a three-point harness, meaning that webbing is attached at three points around the occupant when fastened: an anchor, a retractor, and a buckle. The anchor attaches one end of the webbing to the seat frame. The other end of the webbing feeds into the retractor, which may include a spool that extends and retracts the webbing. A clip slides freely along the webbing and, when engaged with the buckle, divides the webbing into a lap band and a shoulder band.

DETAILED DESCRIPTION

Figure 1:
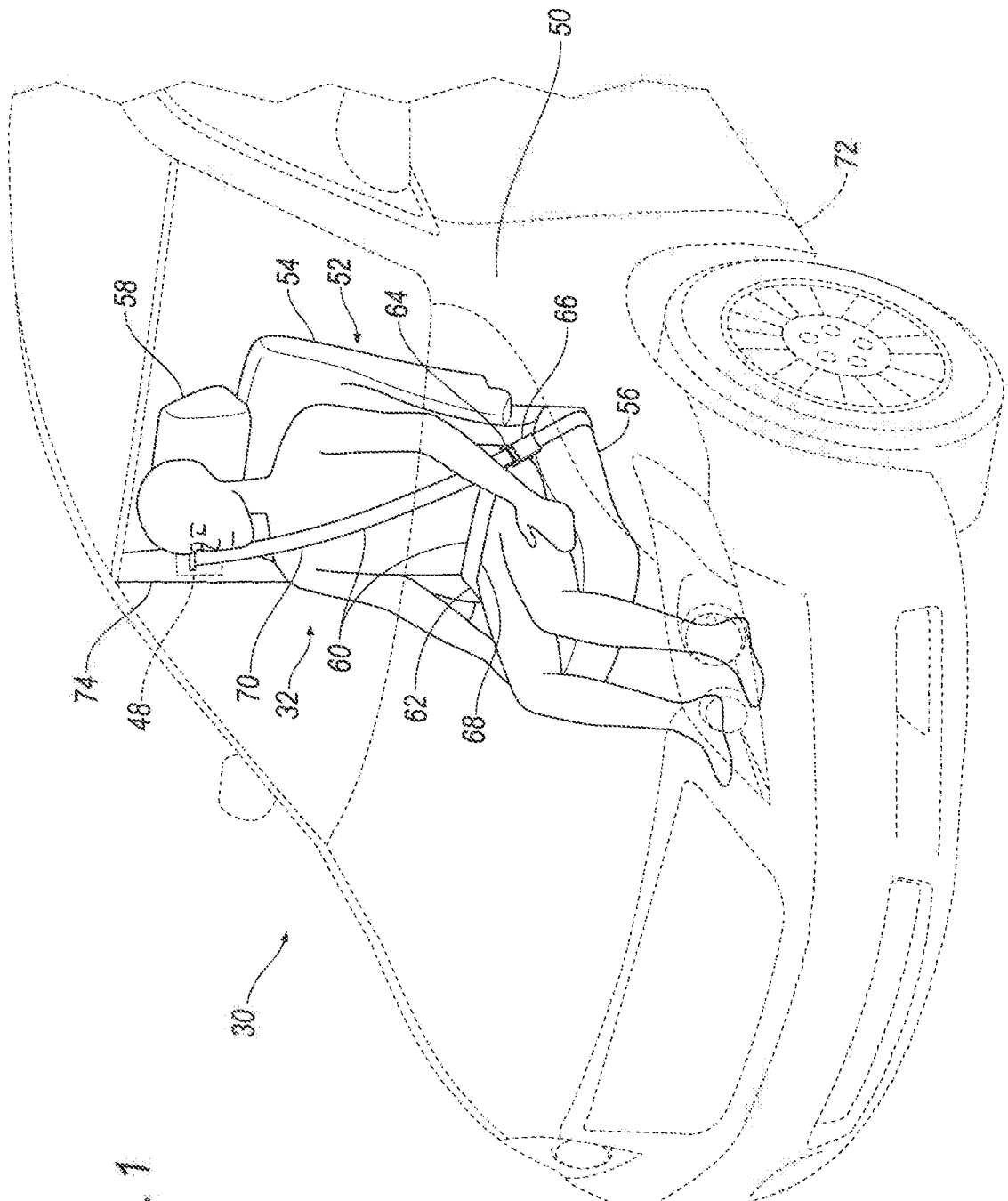
FIG. 1 is a perspective view of a vehicle including a restraint system.

A restraint system includes a retractor housing; a spool rotatably coupled to the retractor housing and defining an axis of rotation; a threaded rod lockable relative to the retractor housing and elongated along the axis; a nut threaded on the threaded rod; and a spring elongated from a first end to a second end, the first end fixed relative to the spool, and the second end fixed relative to the nut.

The spring may be a compression spring positioned coaxially around the threaded rod.

The restraint system may further include an emergency locking mechanism movable between an engaged state and a disengaged state, and the emergency locking mechanism in the engaged state may lock the threaded rod to the retractor housing, and the emergency locking mechanism in the disengaged state may permit rotation of the threaded rod relative to the retractor housing. When the emergency locking mechanism is in the disengaged state, the threaded rod may be rotatable with the spool relative to the retractor housing.

The restraint system may further include a rod plate oriented orthogonal to the axis and fixed relative to the threaded rod, and the threaded rod may be lockable to the retractor housing via the rod plate. The spool may extend along the axis from a first end to a second end, and the rod plate may be positioned at the second end of the spool. The spool may include an end plate oriented orthogonal to the axis and positioned at the first end of the spool, and the first end of the spring may be fixedly attached to the end plate. The spring may be a first spring, the seatbelt retractor may further include a second spring elongated coaxially with the first spring from a first end to a second end, and the first end of the second spring may be fixedly attached to the end plate.

The nut may be threadedly movable along the threaded rod from a starting position to an ending position, and the nut in the starting position may abut the rod plate. When the nut is in the ending position, the spring may be in a fully compressed state. The spring may be a first spring, the seatbelt retractor may further include a second spring elongated from a first end to a second end, the first end of the second spring may be fixed relative to the spool, and the second end of the second spring may be positioned between the starting position and the ending position of the nut.

The threaded rod may include threading, the nut may be threadedly movable along the threaded rod in a rotational and axial direction defined by the threading, and the threading may be oriented such that when the threaded rod is locked to the retractor housing and the spool rotates in an extractive direction, the nut moves in a direction tending to compress the spring.

The spring may be a first spring, the seatbelt retractor may further include a second spring elongated from a first end to a second end, and the first end of the second spring may be fixed relative to the spool. The second end of the second spring may be free.

The second spring may extend coaxially with the first spring.

A stiffness of the first spring may be greater than a stiffness of the second spring.

The first spring in a relaxed position may be longer than the second spring in a relaxed position.

With reference to the Figures, a restraint system 32 for a vehicle 30 includes a retractor housing 34, a spool 36 rotatably coupled to the retractor housing 34 and defining an axis R of rotation, a threaded rod 38 lockable relative to the retractor housing 34 and elongated along the axis R, a nut 40 threaded on the threaded rod 38, and a first spring 42 elongated from a first end 44 to a second end 46. The first end 44 is fixed relative to the spool 36, and the second end 46 is fixed relative to the nut 40.

The restraint system 32 provides for a retractor 48 that is compact and inexpensive. The retractor 48 uses a small number of components and conveniently packages several of the components, such as the threaded rod 38, the nut 40, and the first spring 42, inside the spool 36. Finally, the retractor 48 is resettable, meaning that if the retractor 48 is used to provide load limiting, the same components may be able to be used afterwards (once inspected and reset by a technician).

With reference to FIG. 1, the vehicle 30 may be any passenger or commercial automobile such as a car, a truck, a sport utility vehicle, a crossover, a van, a minivan, a taxi, a bus, etc.

The vehicle 30 includes a passenger cabin 50 to house occupants, if any, of the vehicle 30. The passenger cabin 50 includes a plurality of seats 52, e.g., one or more front seats 52 disposed at a front of the passenger cabin 50 and one or more back seats 52 disposed behind the front seats 52. The passenger cabin 50 may also include third-row seats 52 at a rear of the passenger cabin 50. The position and orientation of the seats 52 and components thereof may be adjustable by an occupant. In FIG. 1, for clarity, a single seat 52 is shown, and the rest of this description discusses the restraint system 32 for one seat 52, but multiple or all seats 52 in the passenger cabin 50 can each have a restraint system 32. The seat 52 is shown to be a bucket seat, but the seat 52 may be another type.

The seat 52 may include a seat back 54, a seat bottom 56, and a head restraint 58. The head restraint 58 may be supported by the seat back 54 and may be stationary or movable relative to the seat back 54. The seat back 54 may be supported by the seat bottom 56 and may be stationary or movable relative to the seat bottom 56. The seat back 54, the seat bottom 56, and/or the head restraint 58 may be adjustable in multiple degrees of freedom. Specifically, the seat back 54, the seat bottom 56, and/or the head restraint 58 may themselves be adjustable, in other words, adjustable components within the seat back 54, the seat bottom 56, and/or the head restraint 58, and/or may be adjustable relative to each other.

The restraint system 32 includes the retractor 48, webbing 60 retractably payable from the retractor 48, an anchor 62 coupled to the webbing 60, and a clip 64. The clip 64 may be adjustable along the webbing 60 and may selectively engage a buckle 66 fixed relative to the seat 52. The restraint system 32, when fastened, retains the occupant on the seat 52, for example, during sudden decelerations of the vehicle 30.

The anchor 62 attaches one end of the webbing 60 to the seat 52. The other end of the webbing 60 feeds into the retractor 48 and is attached to the spool 36, with the webbing 60 wound around the spool 36 beginning at that end. The webbing 60 can be formed of a fabric in the shape of a strap. The clip 64 slides freely along the webbing 60 and, when engaged with the buckle 66, divides the webbing 60 into a lap band 68 and a shoulder band 70.

The restraint system 32 of FIG. 1 is a three-point harness, meaning that the webbing 60 is attached at three points around the occupant when fastened: the anchor 62, the retractor 48, and the buckle 66. The restraint system 32 may, alternatively, include another arrangement of attachment points.

The retractor 48 can be attached to a vehicle body 72 of the vehicle 30, e.g., to a B pillar 74 in the instance the seat 52 is a front seat, to a C pillar (not numbered) when the seat 52 is a rear seat, etc. The retractor 48 may alternatively be mounted to the seat 52.

Figure 2:
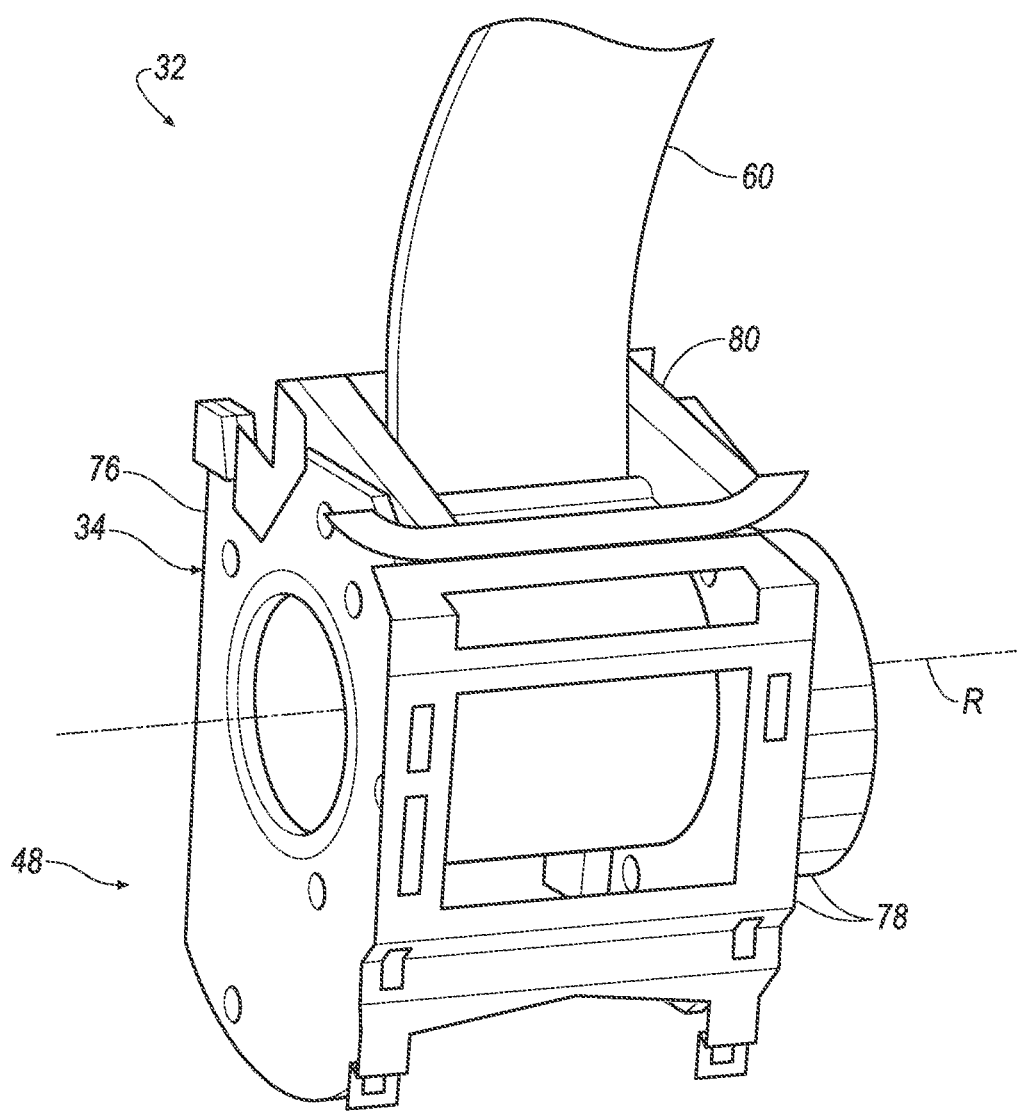
FIG. 2 is a perspective view of a portion of the restraint system.

With reference to FIG. 2, the retractor 48 includes the retractor housing 34. The retractor housing 34 can include a housing body 76, housing covers 78 attached to the housing body 76, and a webbing guide 80 attached to the housing body 76. The retractor housing 34 may be formed of metal or plastic. The retractor housing 34 may be mounted to the vehicle body 72 of the vehicle 30, e.g., to the B pillar 74 in the instance the seat 52 is a front seat, to the C pillar when the seat 52 is a rear seat, or may be mounted to the seat 52.

Figure 3:
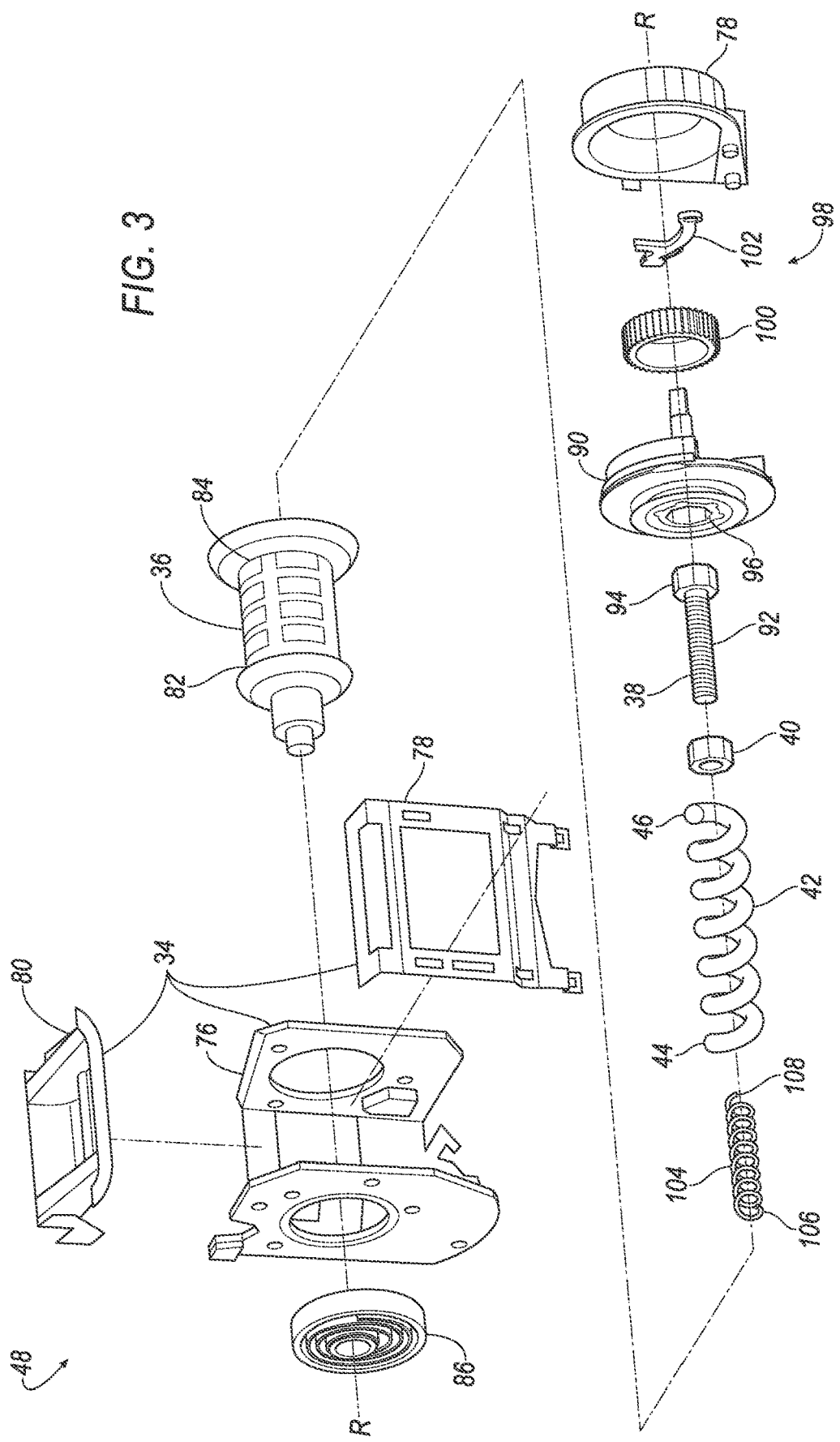
FIG. 3 is an exploded view of a retractor in the restraint system.

With reference to FIG. 3, the spool 36 is rotatably coupled to the retractor housing 34. The spool 36 can freely rotate relative to the retractor housing 34, and is fixed to the retractor housing 34 in all other degrees of freedom. The spool 36 can be cylindrical in shape. The spool 36 defines the axis R, about which the spool 36 rotates. The spool 36 extends along the axis R from a first end 82 to a second end 84. The spool 36 can be adapted to receive the webbing 60, for example, by including a webbing attachment slot (not numbered) and permitting the webbing 60 to wind around the spool 36 starting from the webbing attachment slot.

A spool spring 86 is coupled to the spool 36 and to the retractor housing 34. The spool spring 86 may be loaded in tension or compression when the webbing 60 is fully retracted, and the spool spring 86 may be further loaded in either tension or compression when the webbing 60 is extracted from the spool 36. Thus, the spool spring 86 exerts a force tending to retract the webbing 60. The spool spring 86 may be a spiral torsion spring or any other suitable type of spring.

With reference to FIGS. 3-7, the spool 36 includes an end plate 88. The end plate 88 has a generally planar, circular shape. The end plate 88 is oriented orthogonal to the axis R, i.e., defines a plane orthogonal to the axis R. The end plate 88 is centered on the axis R and is positioned at the first end 82 of the spool 36. The end plate 88 is fixed relative to the rest of the spool 36 and rotates with the rest of the spool 36 about the axis R.

A rod plate 90 is positioned at the second end 84 of the spool 36. The rod plate 90 has a generally planar, circular shape. The rod plate 90 is oriented orthogonal to the axis R, i.e., defines a plane orthogonal to the axis R. The rod plate 90 is centered on the axis R. As described more fully below, the rod plate 90 is connected to the spool 36 via the first spring 42, the nut 40, and the threaded rod 38. As also described more fully below, the rod plate 90 is lockable to the retractor housing 34. When the rod plate 90 is not locked to the retractor housing 34, the rod plate 90 is rotatable with the spool 36 relative to the retractor housing 34.

The threaded rod 38 is elongated along the axis R and centered on the axis R. The threaded rod 38 has a generally cylindrical shape. The threaded rod 38 includes threading 92 on a radially outward surface of the threaded rod 38. The threading 92 extends in a helical shape along and centered on the axis R. The threaded rod 38 is attached to and fixed relative to the rod plate 90. For example, the threaded rod 38 includes a hexagonal bolt head 94 that is press-fit into a hexagonal recess 96 of the rod plate 90. The threaded rod 38 is lockable relative to the retractor housing 34 via the rod plate 90.

Returning to FIG. 3, the retractor 48 may be an emergency locking retractor (ELR). In such an example, the retractor 48 includes an emergency locking mechanism 98 movable between an engaged state and a disengaged state. In the engaged state, the emergency locking mechanism 98 locks the rod plate 90 and threaded rod 38 to the retractor housing 34, i.e., fixing the rod plate 90 and threaded rod 38 relative to the retractor housing 34. In the disengaged state, the emergency locking mechanism 98 permits rotation of the rod plate 90 and threaded rod 38 relative to the retractor housing 34. When the emergency locking mechanism 98 is in the disengaged state, the rod plate 90 and threaded rod 38 are rotatable with the spool 36 relative to the retractor housing 34.

For example, the emergency locking mechanism 98 includes a ratchet 100 and a pawl 102. The ratchet 100 is fixedly attached to the rod plate 90, and the pawl 102 is hingedly attached to the retractor housing 34. The ratchet 100 includes a plurality of teeth, which are aligned circumferentially around and extend radially relative to the axis R. Each tooth includes a first side and a second side, wherein the first side has a shallower angle relative to a circumference of the ratchet 100 than the second side. When the ratchet 100 rotates relative to the pawl 102 such that the first sides of the teeth are presented to the pawl 102, the pawl 102 slides over the teeth, and when the ratchet 100 rotates relative to the pawl 102 such that the second sides of the teeth are presented to the pawl 102, the pawl 102 catches on the second side and prevents rotation of the ratchet 100.

The pawl 102 is hingedly coupled to the retractor housing 34. The pawl 102 is movable between an unlocked position spaced from the ratchet 100 and a locked position engaging the ratchet 100. The pawl 102 has a hinged end and a free end. In the unlocked position, the free end is spaced from the ratchet 100. In the locked position, the free end is contacting the ratchet 100.

The retractor 48 may include an activation sensor (not shown) that senses sudden deceleration of the vehicle 30 and triggers activation of the emergency locking mechanism 98, e.g., the ratchet 100 and pawl 102, to engage the rod plate 90, i.e., to move the emergency locking mechanism 98 from the disengaged state to the engaged state. The activation sensor may be in communication with the pawl 102, either directly or indirectly through a controller (not shown). The activation sensor may be located in the retractor 48 or elsewhere in the vehicle 30. In the retractor 48, the activation sensor may be, for example, a weighted pendulum, a centrifugal clutch, or any other suitable type. In the vehicle 30 outside the retractor 48, the activation sensor may be, for example, post-contact sensors such as accelerometers, pressure sensors, and contact switches; pre-impact sensors such as radar, lidar, and vision-sensing systems; or any other suitable type. The vision systems may include one or more cameras, CCD image sensors, CMOS image sensors, etc.

With reference to FIGS. 4-7, the nut 40 is threaded on the threaded rod 38 and fixedly attached to the second end 46 of the first spring 42. The nut 40 includes internal threading matching the threading 92 of the threaded rod 38, i.e., having the same pitch and helix angle as the threading 92. The nut 40 is movable along the threaded rod 38 in a rotational and axial direction defined by the threading 92. As the nut 40 rotates 360° about the axis R relative to the threaded rod 38, the nut 40 also moves axially by a distance equal to the pitch, i.e., the axial distance between adjacent threads of the threading 92.

The first spring 42 is elongated from the first end 44 to the second end 46. The first end 44 of the first spring 42 is fixed relative to the spool 36, e.g., is fixedly attached to the end plate 88. The second end 46 of the first spring 42 is fixed relative to the nut 40, e.g., welded to the nut 40. The first spring 42 is a compression spring. The first spring 42 may be positioned coaxially around the threaded rod 38. As an example, the first spring 42 may be a coil spring extending along and centered on the axis R. The first spring 42 is positioned coaxially around the threaded rod 38. An inside diameter of the first spring 42 is greater than an outside diameter, i.e., major diameter, of the threaded rod 38.

The retractor 48 includes a second spring 104. The second spring 104 is elongated from a first end 106 to a second end 108. The first end 106 of the second spring 104 is fixed relative to the spool 36, e.g., is fixedly attached to the end plate 88. The second end 108 of the second spring 104 is free, i.e., is not attached to any components except through the first end 106 of the second spring 104. The second spring 104 is a compression spring. The second spring 104 may be positioned coaxially around the threaded rod 38. As an example, the second spring 104 may be a coil spring extending along and centered on the axis R. The second spring 104 is positioned coaxially around the threaded rod 38 and is positioned coaxially inside the first spring 42. An inside diameter of the second spring 104 is greater than the major diameter of the threaded rod 38, and an outside diameter of the second spring 104 is smaller than the inside diameter of the first spring 42.

Figure 8:
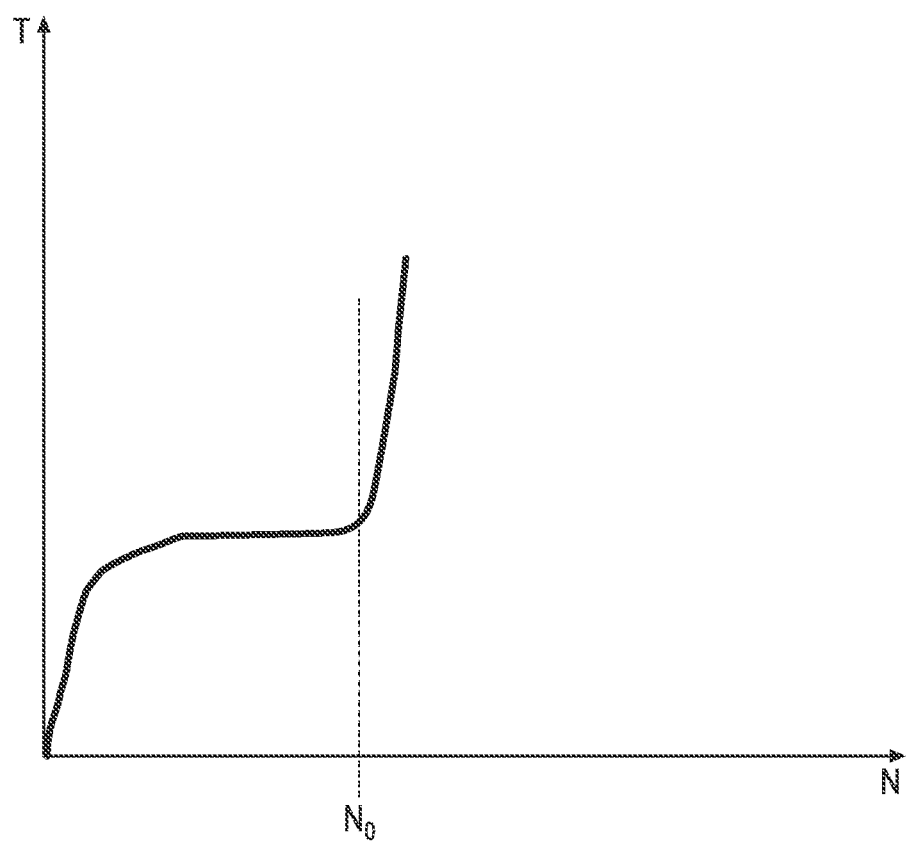
FIG. 8 is a plot of torque exerted by a spool of the retractor with number of turns of the spool.

The first spring 42 in a relaxed position, i.e., neither in tension nor compression, is longer than the second spring 104 in a relaxed position. The lengths of the first spring 42 and second spring 104 are measured along the axis R. A wire diameter of the first spring 42 is greater than a wire diameter of the second spring 104. A stiffness of the first spring 42 is greater than a stiffness of the second spring 104; i.e., a spring constant $k_1$ of the first spring 42 is greater than a spring constant $k_2$ of the second spring 104; i.e., a force $F_1$ exerted by the first spring 42 in response to a change in length x from the relaxed position is greater than a force $F_2$ exerted by the second spring 104 in response to the same change in length x from the relaxed position. The spring constant $k_1$ of the first spring 42 may be linear, as shown in FIG. 8. As another example, the spring constant $k_1$ of the first spring 42 may be nonlinear, e.g., the first spring 42 may be progressive. The spring constant $k_2$ of the second spring 104 may be linear, as shown in FIG. 8. As another example, spring constant $k_2$ of the second spring 104 may be nonlinear, e.g., the second spring 104 may be nonlinear.

Figure 4:
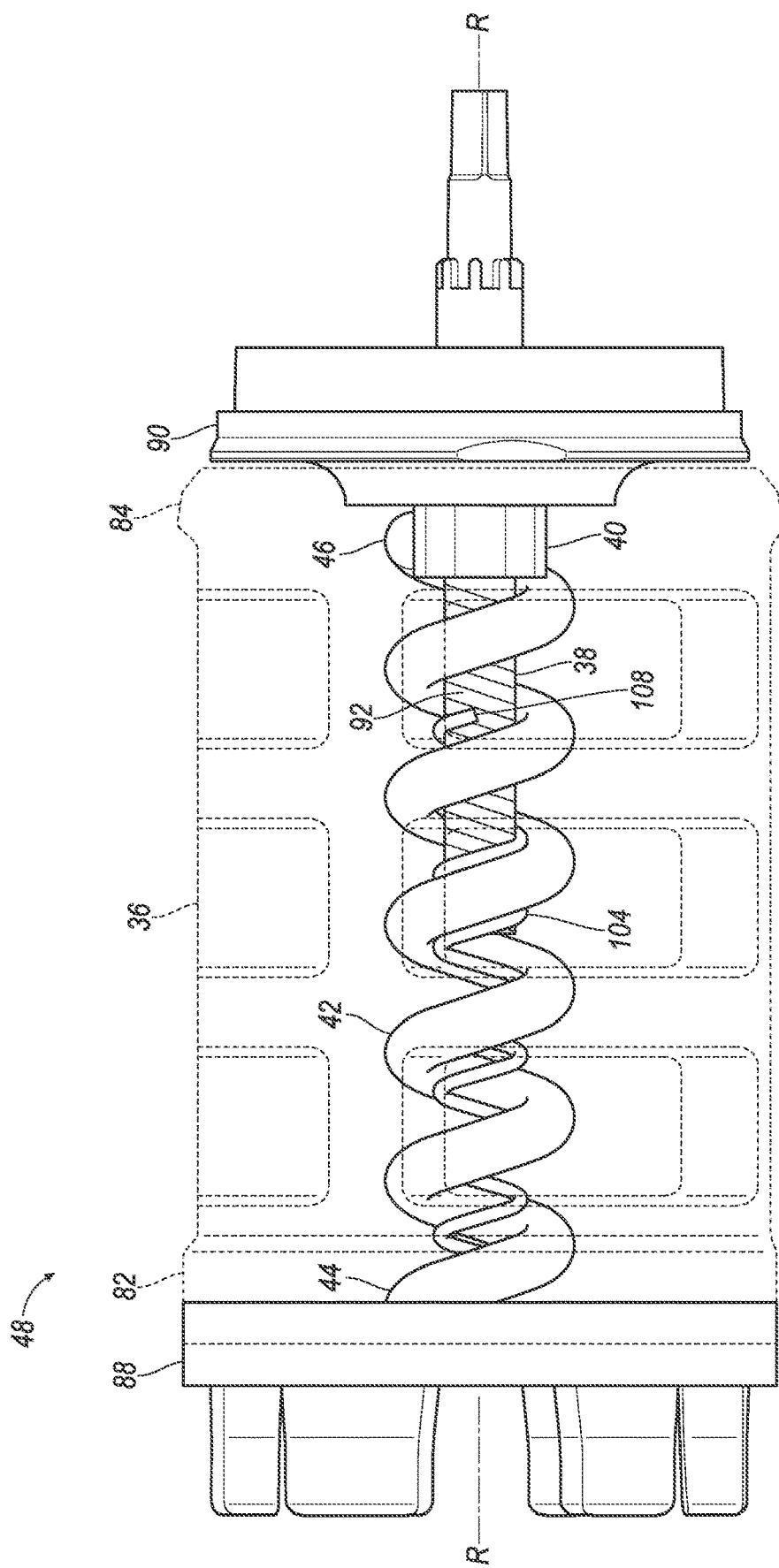
FIG. 4 is a side view of a portion of the retractor.
Figure 5:
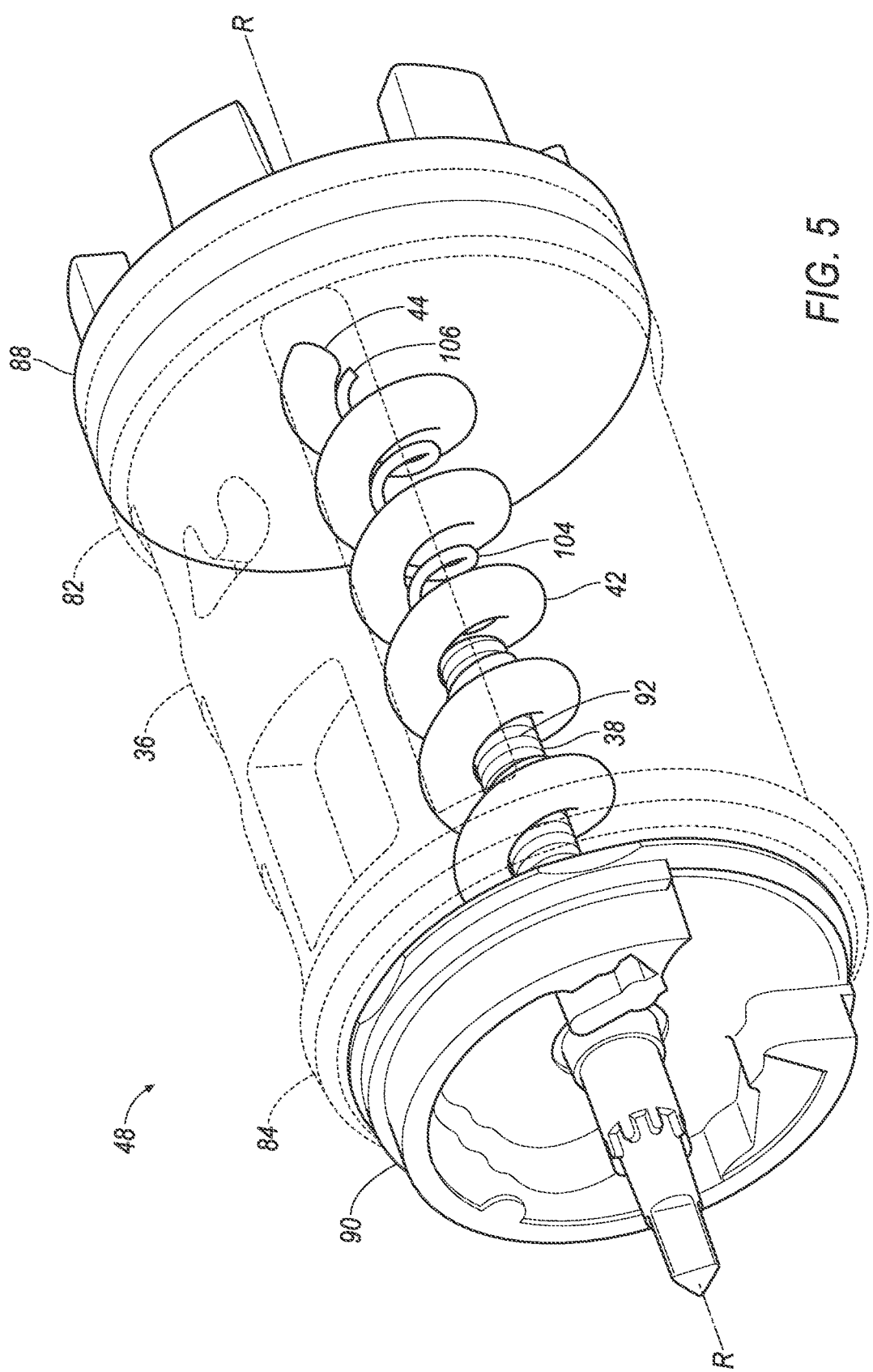
FIG. 5 is a perspective view of a portion of the retractor.
Figure 6:
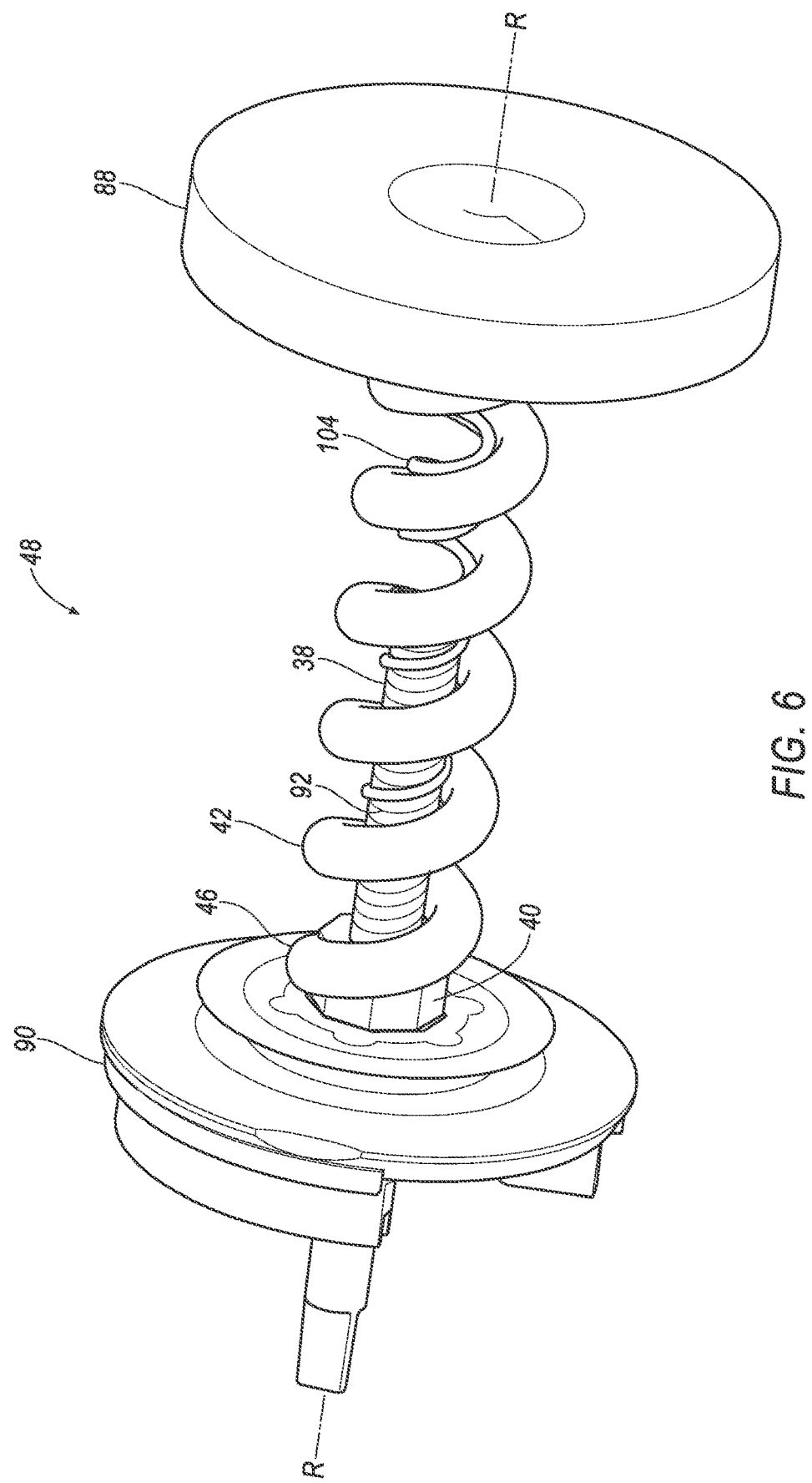
FIG. 6 is a perspective view of a portion of the retractor.
Figure 7:
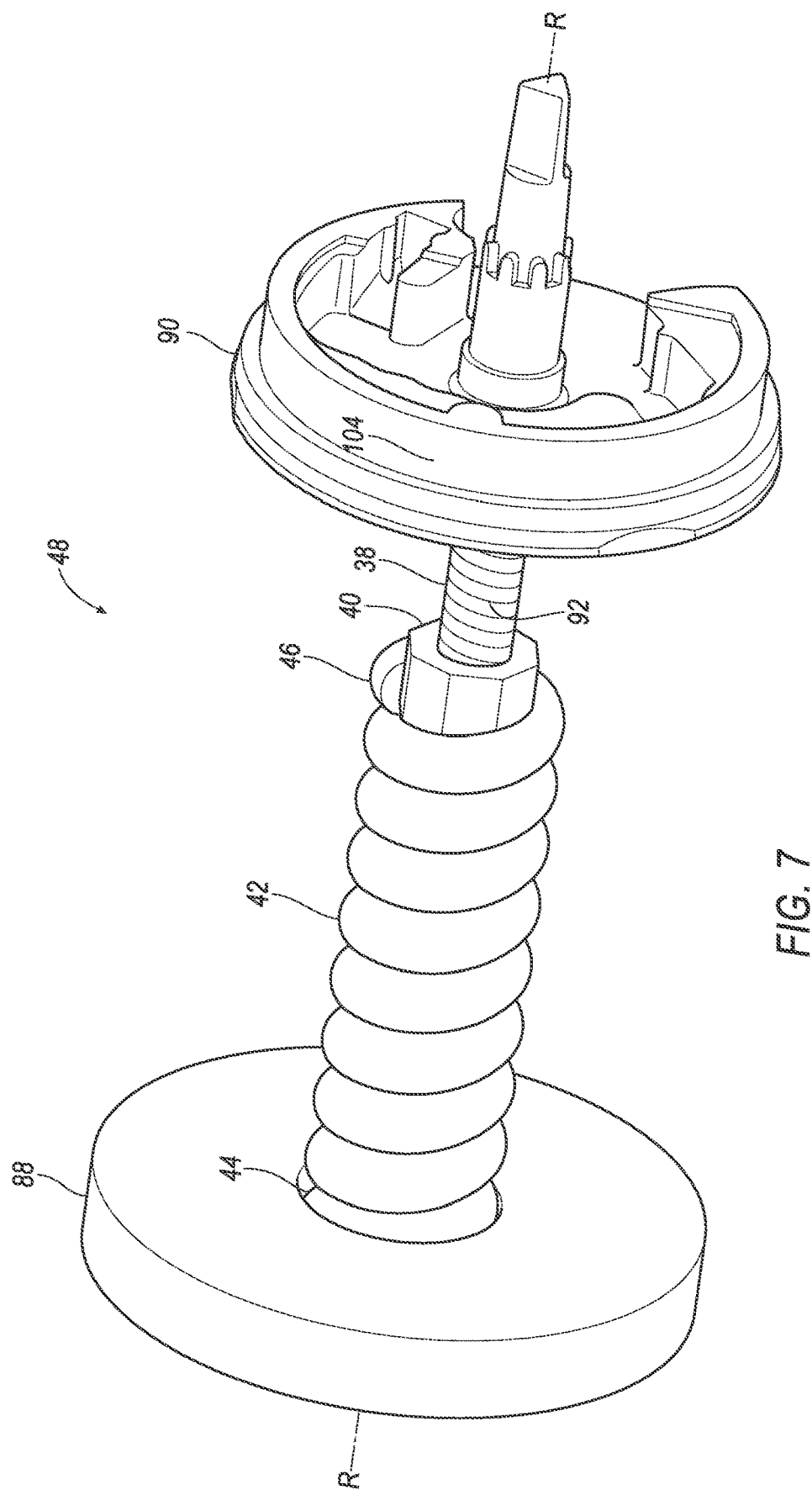
FIG. 7 is a perspective view of a portion of the retractor.

The nut 40 is threadedly movable along the threaded rod 38 from a starting position to an ending position. The nut 40 in the starting position abuts the rod plate 90, as shown in FIGS. 4-6. When the nut 40 is in the ending position, the first spring 42 is in a fully compressed position, i.e., adjacent loops of the spiral shape of the first spring 42 abut each other, as shown in FIG. 7. The second end 108 of the second spring 104 is positioned along the axis R between the starting position of the nut 40 and the ending position of the nut 40. As the nut 40 moves axially from the starting position to the ending position, the nut 40 is initially spaced from the second spring and then contacts and compresses the second spring 104.

In the event of a sudden deceleration of the vehicle 30, the emergency locking mechanism 98 moves from the disengaged state to the engaged state, which locks the rod plate 90 and the threaded rod 38 relative to the retractor housing 34. Momentum of the occupant's torso pulls on the shoulder band 70, which exerts a force on the webbing 60 tending to extract the webbing 60 from the retractor 48, i.e., unwind the spool 36, i.e., exert a torque on the spool 36 in an extractive direction. The threading 92 on the threaded rod 38 is oriented such that when the threaded rod 38 is locked to the retractor housing 34 and the spool 36 rotates in the extractive direction, the nut 40 moves in a direction tending to compress the first spring 42, i.e., away from the rod plate 90 and toward the end plate 88 along the axis R. For example, if the extractive direction is counterclockwise from the perspective of viewing the rod plate 90 straight on, i.e., viewing the retractor 48 from the right side of FIG. 6, then the threading 92 on the threaded rod 38 is right-handed. When the torque rotates the spool 36 in the extractive direction, the end plate 88, the first end 44 of the first spring 42, and the second spring 104 correspondingly rotate in the same direction about the axis R. The rotation of the first end 44 of the first spring 42 relative to the threaded rod 38 causes the first spring 42 to twist tighter and causes the nut 40 to rotate and thus move axially along the threaded rod 38 from the starting position, shown in FIGS. 4 and 6, to the ending position, shown in FIG. 7. The axial movement of the nut 40 compresses the first spring 42, and once the nut 40 reaches the second end 108 of the second spring 104, the axial movement of the nut 40 also compresses the second spring 104.

FIG. 8 shows the torque T of the spool 36 resisting the extraction of the webbing 60 versus number N of complete rotations of the spool 36. The torque T can be represented in units of, e.g., Newton-meters, and the number N is unitless. The torque T increases as the first spring 42 exerts a torque resisting the twisting of the first end 44 relative to the second end 46 and exerts an axial force resisting compression by the nut 40. Once the nut 40 reaches the second end 108 of the second spring 104 at $N=N_0$, the torque T of the spool 36 again increases as the second spring 104 also exerts an axial force resisting compression by the nut 40. The retractor 48 thus provides progressive load limiting.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A restraint system comprising:
   a retractor housing;
   a spool rotatably coupled to the retractor housing and defining an axis of rotation;
   a threaded rod lockable relative to the retractor housing and elongated along the axis;
   a nut threaded on the threaded rod; and
   a spring elongated from a first end to a second end, the first end fixed relative to the spool, and the second end rotationally and axially fixed relative to the nut.

2. The restraint system of claim 1, wherein the spring is a compression spring positioned coaxially around the threaded rod.

3. The restraint system of claim 1, further comprising an emergency locking mechanism movable between an engaged state and a disengaged state, wherein the emergency locking mechanism in the engaged state locks the threaded rod to the retractor housing, and the emergency locking mechanism in the disengaged state permits rotation of the threaded rod relative to the retractor housing.

4. The restraint system of claim 3, wherein when the emergency locking mechanism is in the disengaged state, the threaded rod is rotatable with the spool relative to the retractor housing.

5. The restraint system of claim 1, further comprising a rod plate oriented orthogonal to the axis and fixed relative to the threaded rod, wherein the threaded rod is lockable to the retractor housing via the rod plate.

6. The restraint system of claim 5, wherein the spool extends along the axis from a first end to a second end, and the rod plate is positioned at the second end of the spool.

7. The restraint system of claim 6, wherein the spool includes an end plate oriented orthogonal to the axis and positioned at the first end of the spool, and the first end of the spring is fixedly attached to the end plate.

8. The restraint system of claim 7, wherein the spring is a first spring, the restraint system further comprising a second spring elongated coaxially with the first spring from a first end to a second end, wherein the first end of the second spring is fixedly attached to the end plate.

9. The restraint system of claim 5, wherein the nut is threadedly movable along the threaded rod from a starting position to an ending position, and the nut in the starting position abuts the rod plate.

10. The restraint system of claim 9, wherein when the nut is in the ending position, the spring is in a fully compressed state.

11. The restraint system of claim 10, wherein the spring is a first spring, the restraint system further comprising a second spring elongated from a first end to a second end, wherein the first end of the second spring is fixed relative to the spool, and the second end of the second spring is positioned between the starting position and the ending position of the nut.

12. The restraint system of claim 1, wherein the threaded rod includes threading, the nut is threadedly movable along the threaded rod in a rotational and axial direction defined by the threading, and the threading is oriented such that when the threaded rod is locked to the retractor housing and the spool rotates in an extractive direction, the nut moves in a direction tending to compress the spring.

13. The restraint system of claim 1, wherein the spring is a first spring, the restraint system further comprising a second spring elongated from a first end to a second end, wherein the first end of the second spring is fixed relative to the spool.

14. The restraint system of claim 13, wherein the second end of the second spring is free.

15. The restraint system of claim 13, wherein the second spring extends coaxially with the first spring.

16. The restraint system of claim 13, wherein a stiffness of the first spring is greater than a stiffness of the second spring.

17. The restraint system of claim 13, wherein the first spring in a relaxed position is longer than the second spring in a relaxed position.

* * * * *